(12) United States Patent
Osterlanger et al.

(10) Patent No.: US 7,587,954 B2
(45) Date of Patent: Sep. 15, 2009

(54) BALL SCREW

(75) Inventors: Jurgen Osterlanger, Emskirchen (DE); Dieter Adler, Herzogenaurach (DE); Manfred Kraus, Herzogenaurach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 604 days.

(21) Appl. No.: 10/558,395

(22) PCT Filed: May 24, 2004

(86) PCT No.: PCT/EP2004/005613
§ 371 (c)(1),
(2), (4) Date: Nov. 23, 2005

(87) PCT Pub. No.: WO2004/106775
PCT Pub. Date: Dec. 9, 2004

(65) Prior Publication Data
US 2006/0288813 A1    Dec. 28, 2006

(30) Foreign Application Priority Data
May 30, 2003    (DE) ............................... 103 24 465

(51) Int. Cl.
*F16H 27/02*    (2006.01)
(52) U.S. Cl. ................. 74/89.42; 74/424.71; 74/424.75
(58) Field of Classification Search ................ 74/89.23, 74/89.42, 424.71, 424.75, 424.86, 424.87; 384/516
See application file for complete search history.

(56) References Cited

U.S. PATENT DOCUMENTS

| 4,474,073 | A | * | 10/1984 | Blaurock et al. ......... 74/424.82 |
|---|---|---|---|---|
| 4,680,982 | A | * | 7/1987 | Wilke et al. ............... 74/424.75 |
| 6,722,223 | B2 | * | 4/2004 | Kanda et al. .............. 74/424.82 |
| 6,792,822 | B2 | * | 9/2004 | Ninomiya ................. 74/424.82 |
| 6,925,900 | B2 | * | 8/2005 | Ohkubo .................... 74/424.82 |
| 6,978,693 | B2 | * | 12/2005 | Ohkubo .................... 74/424.87 |
| 6,993,992 | B2 | * | 2/2006 | Kanda et al. .............. 74/424.88 |
| 7,363,835 | B2 | * | 4/2008 | Ohkubo et al. ........... 74/424.86 |

(Continued)

FOREIGN PATENT DOCUMENTS

DE    39 30 900    3/1991

(Continued)

OTHER PUBLICATIONS

Mannesmann Rexroth Deutsche Star: "Prazisions-Kugelgewindetriebe mit Endenlagerungen und Gehausen" 1994, Schweinfurt, XP002293004.

(Continued)

*Primary Examiner*—David M Fenstermacher
(74) *Attorney, Agent, or Firm*—Charles A. Muserlian

(57) ABSTRACT

Ball screw having a spindle nut (2) arranged on a spindle (1), together with balls (3) which are arranged in a series and are capable of rolling in a helical ball track (4), the helical ball track (4) being defined by a thread groove (5) formed on the spindle (1) and by a thread groove (6) formed on the spindle nut (2), the balls (3) arranged in a series being returned in a return duct (7) from an outlet end to an inlet end of the helical ball track (4), the divided circle end play of the series of balls being less than or equal to 0.3 millimeters or the ratio between the pitch of the helical ball track (4) and the diameter of the balls (3) ranging from 1.02 to 1.2 or the thread grooves (5, 6) of the spindle nut (2) and of the spindle (1) in each case having a gothic profile (8, 9), a pressure angle formed by the balls (3) in contact with the gothic profile (8, 9) ranging from 15 to 35 degrees.

5 Claims, 2 Drawing Sheets

U.S. PATENT DOCUMENTS

| | | | |
|---|---|---|---|
| 7,390,241 B2 * | 6/2008 | Kajita | 451/52 |
| 2003/0061893 A1 | 4/2003 | Miyaguchi et al. | |

FOREIGN PATENT DOCUMENTS

| | | |
|---|---|---|
| DE | 4133443 | 4/1993 |
| DE | 44 43 137 | 6/1996 |
| DE | 197 49 137 | 6/1998 |
| DE | 198 03 250 | 10/1998 |
| DE | 100 22715 | 12/2000 |
| DE | 199 44 875 | 3/2001 |
| DE | 100 03 619 | 8/2001 |
| DE | 101 40 884 | 8/2002 |
| EP | 1 279 866 | 1/2003 |
| JP | 10153245 | 6/1998 |
| JP | 2000039052 | 2/2000 |
| JP | 2003137112 | 5/2003 |

OTHER PUBLICATIONS

THK: "High speed ball screw with caged ball technology" Feb. 2002,XP002293176, URL:http://www.thk.co.jp/archive-file/technical_dl/pdf_en/SBN(E).pdf>.

NSK: "Ball screws", Dec. 15, 2003,XP002293205,URL:http://web.acchive.org/web/*/http://www.onexiainc.com/pdf/NSK-Ball-Screw.pdf>.

SMI:"catalog", Feb. 2003, XP002293174,URL:http://www.smi4motion.com/2products/PDF/SMI%20General%20Catalog%201.02.03.pdf>.

INA:"Nadelrollen NRB", XP002293003URL:http://medias.ina.de/medias/dehp.info.body/NRB*UK*4>.

NEFF: "Screw Drives", Feb. 2003, XP002293175,URL:http://www.sbaab.se/pdf/ina_kulskruv.pdf>.

Damnaher Motion Thomson: "Prazisions-Kugelgewindetriebe", Feb. 2003, XP002293179, URL:http://www.danaherlinear.com/PDFs/Cataloga_andBrochures/Ballscrew_Catalog_European.pd.

KLM: "Lineartechnikkomponenten", Oct. 22, 2003, XP002293002, URL:http://web.archive.org/web/20031022224146/http://www.kml.at/1tk/1tk4Kugelgewindetriebe.htm1>.

* cited by examiner

ID 1

BALL SCREW

This application is a 371 of PCT/EP2004/005613 filed May 24, 2004.

The present invention relates to a ball screw. The invention relates, for example, to those ball screws which have recently come to be used in electromechanical steering mechanisms of motor vehicles. In such applications the spindle nut may be driven by an electric motor, the spindle being displaced linearly under the rotation of the spindle nut.

DE 101 40 884 A1, for example, has disclosed a ball screw having a spindle nut arranged on a spindle, together with balls which are arranged in a series and are capable of rolling in a helical ball track, the helical ball track being defined by a thread groove formed on the spindle and by a thread groove formed on the spindle nut, the balls arranged in a series being returned in a return duct from an outlet end to an inlet end of a common turn of the helical ball track. In such ball screws running noises occur in the event of especially rapid rotational movements of the spindle nut. These running noises are often caused by abrupt contact between the balls and also by knocking together of the balls in the return duct of the spindle nut. Such running noises are perceived as a nuisance especially where such ball screws are used in electrochemical steering mechanisms. The object of the present invention is therefore to specify a ball screw according to the above features, in which running noises are reduced.

THE INVENTION

The invention proposes various measures for achieving this object, which not only independently of one another but also in combination with one another significantly reduce the running noises. In a first measure according to the invention the circumferential clearance (TES) of the series of balls is less than or equal to 0.3 mm. The balls are arranged in a series, the series of balls circulating endlessly in their helical ball track by way of the return duct. It has been discovered that the running noise can be significantly reduced if the distance between the first and last ball in the in the series of balls—that is to say the circumferential clearance (TES)—is less than or equal to 0.3 mm. With this circumferential clearance, although knocking contacts between the balls cannot be excluded, the pulses occurring here are only faintly manifest, owing to the small circumferential clearance.

In a further measure according to the invention the ratio between the pitch of the helical ball track and the diameter of the balls ranges from 1.02 to 1.2. This ratio permits the use of the largest possible balls. Large balls run more quietly in the ball screw than balls of a smaller diameter. This measure likewise helps to reduce the running noises. The proposed range is particularly useful in ensuring quiet running.

In a further measure according to the invention the thread grooves both of the spindle nut and of the spindle in each case have a gothic profile, a pressure angle formed by the balls in contact with the gothic profile ranging from 15 to 35°. These small pressure angles result in shallow thread grooves, so that only a slight lifting of the balls is necessary, especially in the return area of the balls. Harmonius ball guiding is consequently possible even in the ball return area. The overall height of the spindle nut can furthermore be reduced. In the return area the balls are lifted off from the thread groove of the spindle and are introduced into the return duct. It was found with the proposed pressure angle range that running noises are significantly reduced in comparison to other pressure angles. A common feature of all these measures is that they are purposely intended to influence the path of the balls and the ball movements.

The return duct is preferably defined by a return groove of the spindle nut, this return groove likewise having a gothic profile, which also preferably has a pressure angle ranging from 25 to 35°. The return groove may be conventionally formed on a return piece, which is arranged in a recess in the spindle nut.

BRIEF DESCRIPTION OF THE DRAWINGS

The invention will be explained in more detail below with reference to an exemplary embodiment represented in a total of three figures, of which

DETAILED DESCRIPTION OF THE INVENTION

Figure 1:
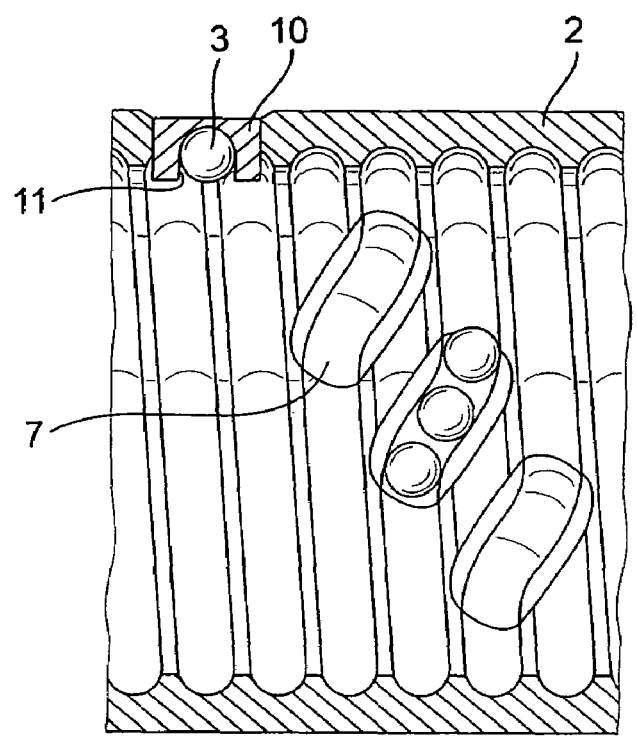
FIG. 1 shows a longitudinal section through a ball screw according to the invention
Figure 2:
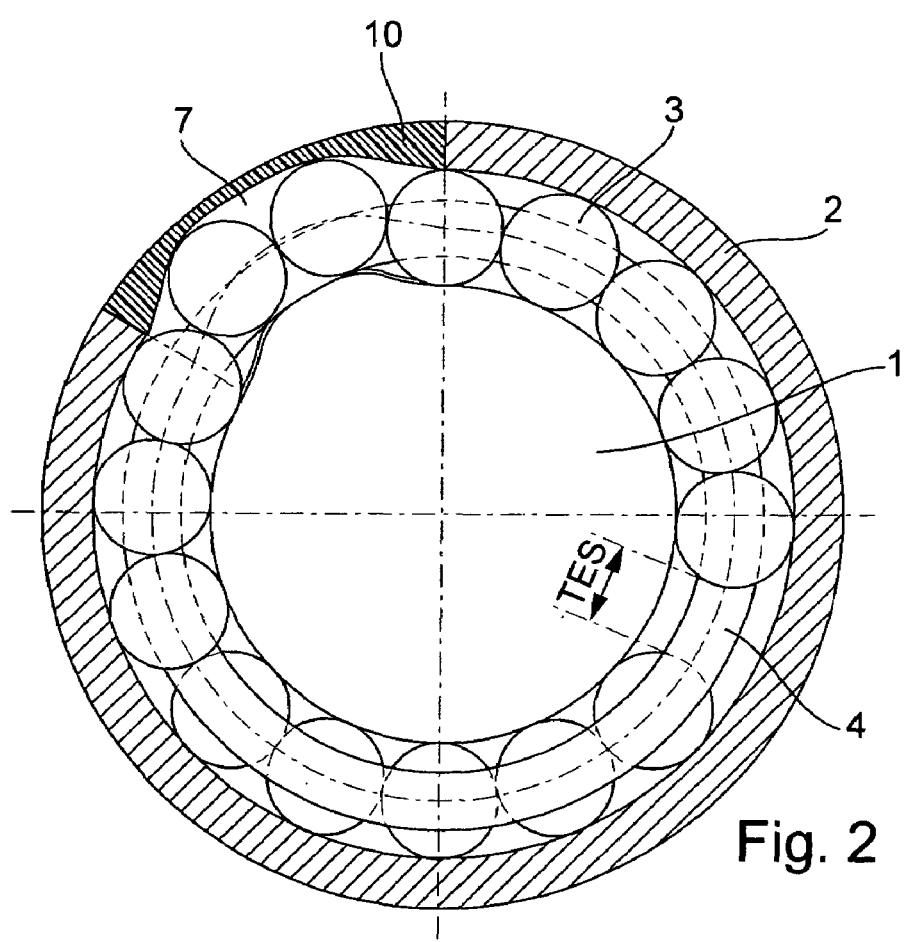
FIG. 2 shows a cross-section through the ball screw and FIG. 3 shows an enlarged representation of a partial longitudinal section through the ball screw according to the invention
Figure 3:
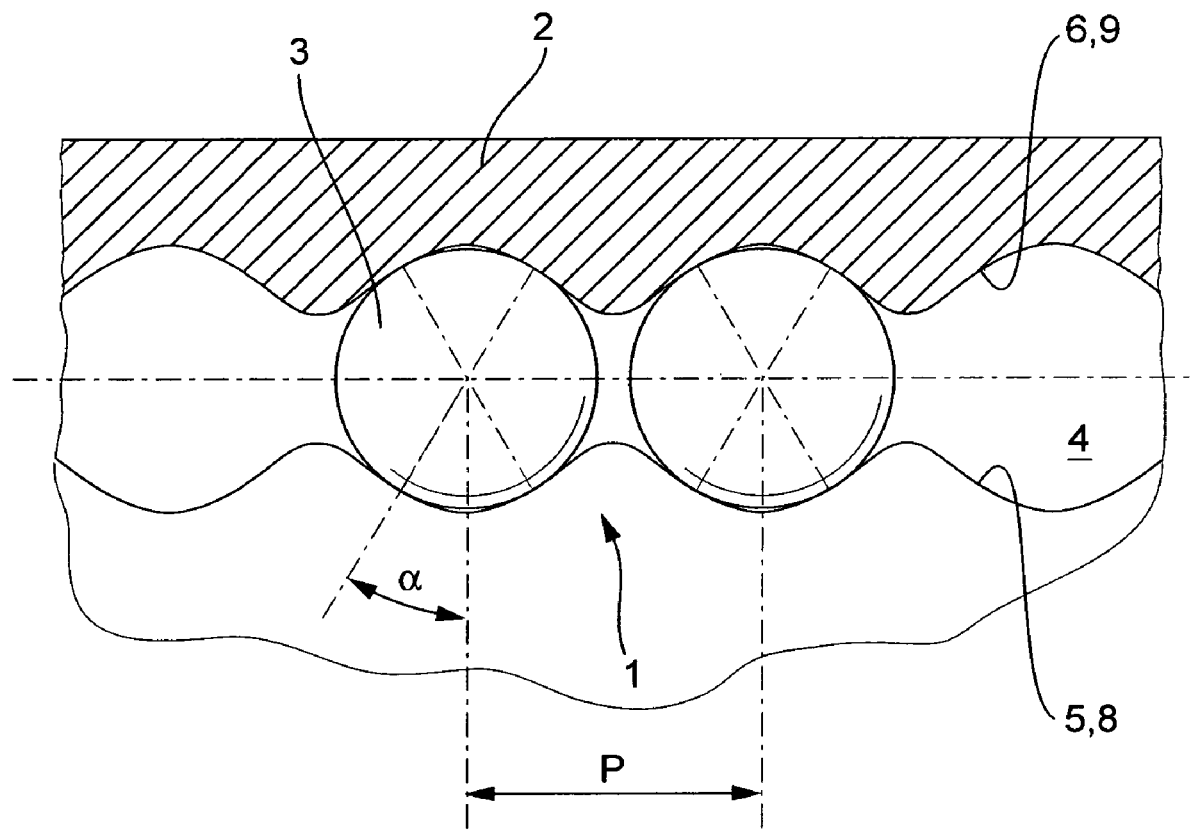

The ball screw according to the invention represented in FIGS. 1 to 3 comprises a spindle nut 2 arranged on a spindle 1, together with balls 3 which are arranged in a series and are capable of rolling in a helical ball track 4. The helical ball track 4 is defined by a thread groove 5 formed on the spindle 1 and by a thread groove 6 formed on the spindle nut 2. The balls 3 arranged in a series are returned in a return duct 7 of the spindle nut 2 from an outlet end to an inlet end of a common turn of the helical ball track 4.

FIG. 2 clearly shows the circumferential clearance (TES) between the first and the last ball of a series of balls. According to the invention this circumferential clearance is less than or equal to 0.3 mm. In the figure this circumferential clearance is shown somewhat exaggerated merely for the reasons of clarity.

It can be seen from FIG. 3 that the thread grooves 5 and 6 in the spindle 1 and the spindle nut 2 are each provided with a gothic profile 8 and 9 respectively. This gothic profile permits a geometrically precise guiding of the balls along the helical ball track 4. The pressure angle $\alpha$ formed by the balls 3 in contact with the gothic profile 8, 9 of the thread grooves 5, 6 preferably ranges from 25 to 35°. The ratio between the pitch P and the diameter of the balls 3 furthermore ranges from 1.02 to 1.2.

It can be seen from FIGS. 1 and 2 that a return piece 10 is arranged in the return area of the balls 3. This return piece 10 has a return groove 11 defining the return duct 7 and on which the balls 3 roll. This return groove 11 is likewise provided with a gothic profile (not represented further), as is also provided in the thread grooves 5 and 6 of the spindle 1 and the spindle nut 2. The gothic profile of this return groove also has a pressure angle formed in contact with the balls which ranges from 15 to 35°.

A distinguishing feature of the ball screw depicted and described here is its particularly quiet running. This ball screw according to the invention is therefore especially suited to use in electromechanical steering mechanisms.

Instead of the ball screw with internal return described here by way of an example, it is also possible to provide a ball screw with an external return by arranging a tubular return piece radially outside the thread groove of the spindle nut.

The invention claimed is:

1. A ball screw having a spindle nut arranged on a spindle, together with balls which are arranged in a series and are capable of rolling in a helical ball track, the helical ball track being defined by a thread groove formed on the spindle and by a thread groove formed on the spindle nut, the balls arranged in a series being returned in a return duct from an outlet end to an inlet end of a common turn of the helical ball track, wherein the ratio between the pitch of the helical ball track and the diameter of the balls ranges from 1.02 to 1.2.

2. A ball screw having a spindle nut arranged on a spindle, together with balls which are arranged in a series and are capable of rolling in a helical ball track, the helical ball track being defined by a thread groove formed on the spindle and by a thread groove formed on the spindle nut, the balls arranged in a series being returned in a return duct from an outlet end to an inlet end of the helical ball track, wherein the thread grooves of the spindle nut and of the spindle in each case have a gothic profile, a pressure angle formed by the balls in contact with the gothic profile ranging from 15 to 35 degrees.

3. The ball screw as claimed in claim 2, wherein the return duct is defined by a return groove which is provided on the spindle nut and on which the balls roll, the return groove having a gothic profile.

4. The ball screw as claimed in claim 2, wherein a pressure angle formed by the balls in contract with gothic profile of the return groove ranges from 25 to 35 degrees.

5. The ball screw as claimed in claim 3, wherein the return groove is formed on a return piece, which is arranged in a recess in the spindle nut.

* * * * *